Figure 3:
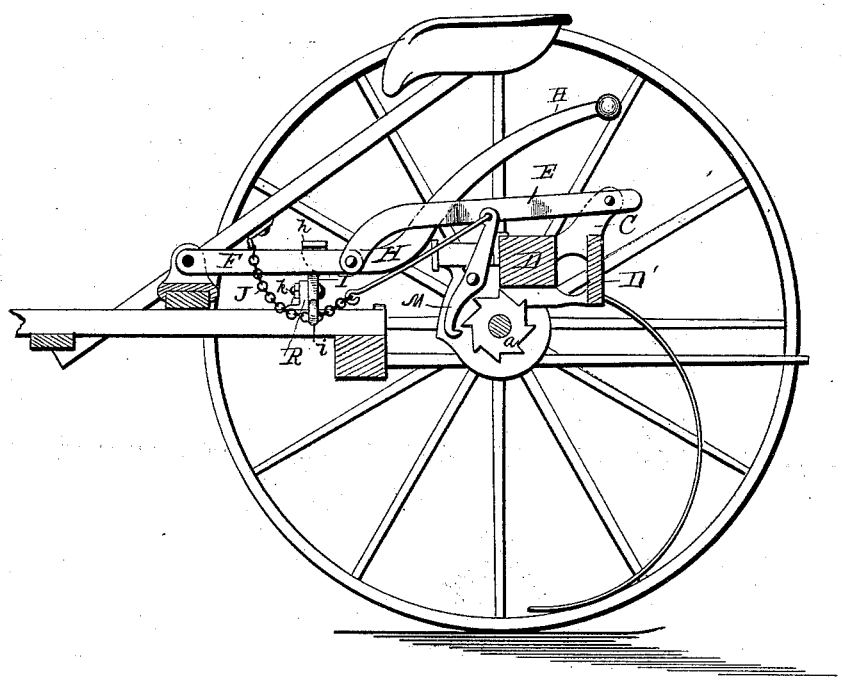

(No Model.) 2 Sheets—Sheet 1.
L. KISSNER & J. J. GROMME.
HORSE HAY RAKE.
No. 369,604. Patented Sept. 6, 1887.
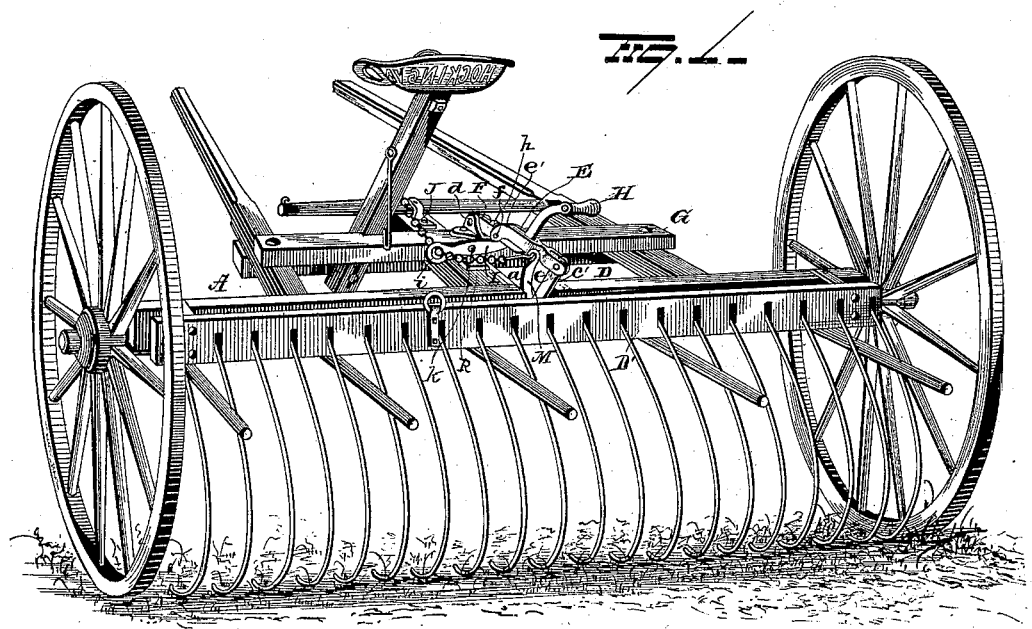
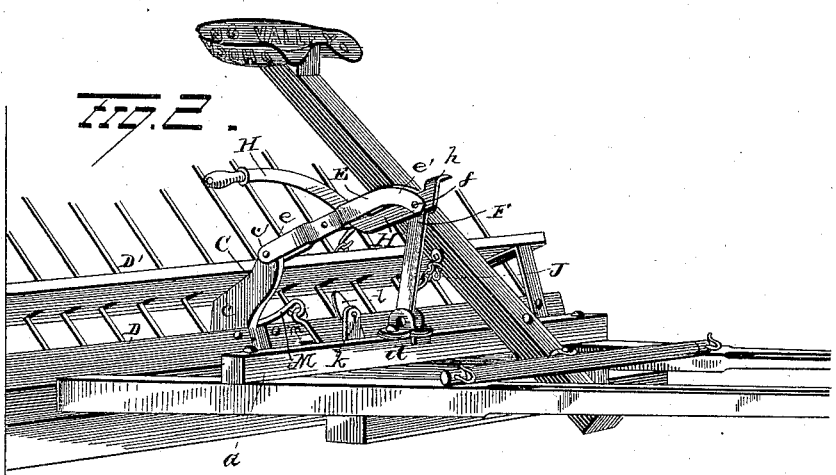
WITNESSES
INVENTOR (No Model.) 2 Sheets—Sheet 2.

L. KISSNER & J. J. GROMME.
HORSE HAY RAKE.

No. 369,604. Patented Sept. 6, 1887.

Witnesses
J. E. Jones
Geo. F. Downing

Inventor
L. Kissner
J. J. Gromme
By their Attorneys
Leggett & Leggett

UNITED STATES PATENT OFFICE.

LEONARD KISSNER AND JOHN JUSTUS GROMME, OF LANCASTER, OHIO, ASSIGNORS TO THE HOCKING VALLEY MANUFACTURING COMPANY, OF SAME PLACE.

HORSE HAY-RAKE.

SPECIFICATION forming part of Letters Patent No. 369,604, dated September 6, 1887.

Application filed December 6, 1886. Serial No. 220,814. (No model.)

*To all whom it may concern:*

Be it known that we, LEONARD KISSNER and JOHN JUSTUS GROMME, of Lancaster, in the county of Fairfield and State of Ohio, have invented a certain new and useful Improvement in Horse Hay-Rakes; and we do hereby declare the following to be a full, clear, and exact description of the invention, such as will enable others skilled in the art to which it appertains to make and use the same.

Our invention relates to an improvement in horse hay-rakes.

Hitherto combined hand and draft dumping-rakes have generally been so constructed that the hand dumping-lever would simultaneously travel forward and backward with the dumping of the rake when the dumping is effected by the draft of the horse. Objection has arisen to this form of dumping device, because the driver was in continual danger of being unexpectedly hit by the moving handle; and the object of our invention is to provide a device whereby the dumping may be effected either by the driver or horse, and, when by the latter, without causing any material movement of the handle.

A further object is to provide a simple and convenient dumping device which may be adjusted to any horse-rake, will be locked against accidental displacement when the rake is lowered, and one which may be placed on the market at a low initial cost.

With these ends in view our invention consists in certain features of construction and combinations of parts, as will be hereinafter described, and pointed out in the claims.

In the accompanying drawings, Figure 1 is a view in perspective of a rake with our improved dumping device attached. Fig. 2 shows the position of parts when the rake-teeth are in elevated adjustment, and Fig. 3 is a vertical sectional view.

A represents the rake, to which our improved dumping mechanism is attached. The rake is provided with a rotary axle, its motion being caused by suitable gear-connections attached to the wheels, or by any other suitable means, and the axle carries a ratchet-toothed wheel, $a$, midway of its length, to which further reference will be made.

The rake-head-operating arm C, preferably having the straight shoulder $c$ on one side, is rigidly secured to and between the bars D D' of the rake-head midway their length, its end $c'$ forming an upwardly-projecting lever. The manner of securing the bars D D' and the rake-head-operating arm C is not essential, and may be effected by any well-known means—for example, by screws or bolts. A connecting bar or link, E, loosely connects the upper end, $c'$, of rake-head-operating arm C with the forward pivoted arm, F, the lower end of which is pivotally secured between the upwardly-turned jaws or bifurcated lug $d$, secured on the transverse bar G of the rake. The connecting bar or link E is bifurcated preferably at both ends, the rake-head-operating arm C being pivoted between the parts of the rear bifurcated end, $e$, and the pivoted arm F between the gradually downwardly-bending forward bifurcated ends, $e'$.

The handle H, about the length of the connecting bar or link E, is also pivoted at its forward end between the forks of the forward end of link E, its point of pivotal contact $f$ acting as a fulcrum when the handle H is operated. The forward portion of the handle is preferably straight for a short distance back of the fulcrum $f$, after which it bends upward and backward, forming the long arm of the handle, the middle portion of the link E forming a shoulder upon which the handle H normally rests. A nose, $h$, is formed on the extreme forward end of handle H, forward of the fulcrum $f$, which nose clasps over the pivoted arm F when the latter is depressed and the rake is lowered. When in this adjustment, the rake-teeth are securely locked down in contact with the ground, so that any amount of jolting of the rake over stones and dead furrows will not break its lock; but a transverse lever, I, with an eye, $i$, in the end of its long arm, is pivoted to the lug $k$, which lug is located on a block, R, forward of the rocking rake-head, the short arm, $l$, of lever I resting normally beneath the arm F when the latter is depressed. A chain or similar connection, J, passes through the eye $i$, one end being secured to the rake-frame in front of the lever I conveniently to the seat-support, and the opposite end to the end of the pawl M. This pawl M is pivoted to the rocking rake-head, and when the driver's foot is placed on the chain J the long arm of the transverse lever I is depressed, its opposite end rising and coming in contact with the arm F elevates and unlocks or releases the arm, link, and handle. The pawl M, being thrown in contact with the teeth of the ratchet-wheel $a$ on the axle by the same movement of the chain, dumps the rake by the draft of the horse. The pawl M revolves upward and forward with the rocking rake-head until it strikes a stud, $m$, on the frame, when it is released from the ratchet-wheel and automatically drops the rake for a new load. During this entire operation the relative position of handle H has been the same, owing to the weight of its rear end and its being secured near the forward end on the same pivot, $f$, with pivoted arm F. The same operation may be performed by the use of the handle, the lock of the parts being broken by the lifting motion at the fulcrum. When dumped, the rake from its own weight falls back into depressed or raking position.

It is evident that slight changes might be resorted to in the form and arrangement of the several parts described without departing from the spirit and scope of our invention; hence we do not wish to limit ourselves to the particular construction herein set forth; but, Having fully described our invention, what we claim as new, and desire to secure by Letters Patent, is—

1. The combination, with a rake-frame, of a rocking rake-head, a jointed device consisting of an arm rigidly secured to the rake-head, an arm pivoted on the rake-frame forward of the rake-head, a link connecting these arms, a hand-lever fulcrumed on the pivot connecting the forward end of the link with the pivoted arm and terminating at its forward end in a lateral nose, and an independent lever located below the jointed device and adapted by an engagement with said jointed device to break its lock or permit the rake-head to be elevated, substantially as set forth.

2. The combination, with the rake-frame and the rocking rake-head, of an arm pivoted at one end to the former and an arm rigidly secured to the latter, a link loosely connecting said arms, an independent transverse lever having one end located normally beneath the jointed device, and a flexible connection extending from a pawl on the rake-head to the rake-frame and through the opposite end of the independent lever, for the purpose, substantially as set forth.

3. The combination, with the rake head and frame, of an arm secured to the rake-head, an arm pivoted to the frame, a link loosely connecting these arms, and a hand dumping-lever pivotally mounted on the pivot connecting the forward end of the link with the pivoted arm, said hand dumping-lever extending forward of its pivot and terminating at its forward end in a nose adapted to bear on the pivoted arm, for the purpose substantially as set forth.

4. The combination, with the rake head and frame, of an arm rigidly secured to the rake-head, an arm pivoted on the frame, a link connecting said arms, a hand dumping-lever pivotally mounted on the pivot connecting the pivoted arm to the forward end of the link, an independent transversely-located lever having one end in the vertical plane with the link, a pawl pivoted on the rake-head, and a chain extending through one end of the transverse lever and loosely connecting the pawl with the rake-frame, substantially as set forth.

In testimony whereof we have signed this specification in the presence of two subscribing witnesses.

LEONARD KISSNER.
JOHN JUSTUS GROMME.

Witnesses:
P. A. GORDON,
C. W. McCLEERY.